US011417044B2

(12) United States Patent
Long

(10) Patent No.: US 11,417,044 B2
(45) Date of Patent: Aug. 16, 2022

(54) ADVANCED DELAY ANALYSIS MECHANISM

(71) Applicant: Thomas Charley Long, Colorado Springs, CO (US)

(72) Inventor: Thomas Charley Long, Colorado Springs, CO (US)

(*) Notice: Subject to any disclaimer, the term of this patent is extended or adjusted under 35 U.S.C. 154(b) by 0 days.

(21) Appl. No.: 16/415,124

(22) Filed: May 17, 2019

(65) Prior Publication Data
US 2020/0143577 A1 May 7, 2020

Related U.S. Application Data
(60) Provisional application No. 62/673,927, filed on May 20, 2018.

(51) Int. Cl.
G06T 13/80 (2011.01)
G06T 11/20 (2006.01)
G06T 11/00 (2006.01)

(52) U.S. Cl.
CPC ............ G06T 13/80 (2013.01); G06T 11/001 (2013.01); G06T 11/20 (2013.01)

(58) Field of Classification Search
CPC ........ G06T 13/80; G06T 11/001; G06T 11/20
See application file for complete search history.

(56) References Cited

U.S. PATENT DOCUMENTS

| | | | | |
|---|---|---|---|---|
| 6,750,864 B1* | 6/2004 | Anwar | ................... | G06T 11/206 345/440 |
| 6,888,554 B1* | 5/2005 | Decombe | ............ | G06F 16/9024 345/645 |
| 10,586,362 B2* | 3/2020 | Lee | ........................ | G06F 3/0486 |
| 2005/0140694 A1* | 6/2005 | Subramanian | .......... | G06F 9/545 345/619 |
| 2006/0044307 A1* | 3/2006 | Song | ...................... | G06Q 10/06 345/419 |
| 2012/0159298 A1* | 6/2012 | Fisher | ................... | G06F 40/103 715/215 |
| 2015/0040052 A1* | 2/2015 | Noel | .................... | G06F 3/04847 715/771 |
| 2015/0113460 A1* | 4/2015 | High | ....................... | G06F 9/451 715/771 |
| 2017/0083585 A1* | 3/2017 | Chen | ..................... | G06F 11/323 |
| 2018/0246502 A1* | 8/2018 | Meier | ................ | G05B 19/4093 |

OTHER PUBLICATIONS

Lodha, S. K., Wilson, C. M., & Sheehan, R. E. (Nov. 1996). LISTEN: sounding uncertainty visualization. In Proceedings of Seventh Annual IEEE Visualization'96 (pp. 189-195). IEEE.*

* cited by examiner

Primary Examiner — Sarah Lhymn

(57) ABSTRACT

A computer graphics display system and method which places moving and color changing geometric shapes, which represent tasks of a project, on a circular graph by means of a display such as a computer monitor, (similar to a radar screen) which alerts the user to impending delays to a project by means of visualization of the movement and color change of the geometric shapes or "blips" on the circular graph. The method comprises extracting information from planning calculations, then translating this information into an animated visual radial graphic display.

5 Claims, 3 Drawing Sheets

ADVANCED DELAY ANALYSIS MECHANISM

CROSS REFERENCE

The present application claims benefit of Provisional Application No. 62/673,927 with filing date May 20, 2018 (20 May 2019).

TECHNICAL FIELD

The present invention generally relates to the field of project planning and control, and more specifically of a display system to visualize impending impacts to a project's duration.

BACKGROUND

The most commonly used method of modeling the time and criticality of different activities within a project is known as the critical path method or CPM. It is the basic model used by nearly all planning software. At its heart, is a simple path finding algorithm having nodes which are point-in-time events and a distance between nodes which is measured in time. An activity in the CPM measures the amount of time to do the work of that task. More specifically, it measures the amount of time to get from one node, the start, to another, the finish. Then these tasks are related to each other's starts and finishes, which comprises the network logic. As an example, once activity A finishes then activity B can start. The plan is made up of either the measure of time between the start and finish of an activity, or the measure of time between activities in the logic, which is known as lag. Together, they make up the core of the CPM network.

Planning calculations are then performed by a computer, which travels down every possible path of this network, adding the durations of and between activities, primarily to find the chain of nodes with the longest duration. This longest chain, is known as the critical path, which is the barometer of how long the project will take to complete at any given point in time. Any delay to work on the critical path will by definition delay project completion. But also, by traveling down every path, these computations determine (among other things), when the earliest date an activity can start or finish according to this network chain of logic and durations. This is known as the "early start" date. The difference between any chain of activities and the longest chain (critical path) is a quantity known as "total float" or "slack". This represents the amount of time activities can be delayed before they become critical and start delaying the project.

This computer modeling can be dynamic as the work progresses or the scope changes. The CPM model can then be revised or updated with the actual starts and finishes incorporated at points in time where the program is updated. This typically yields new "float" and "early start" calculations for the activities.

Relatively recently, with the advent of more memory and power in computers, algorithms have been developed which can locate progress within activities so that calculations can be made on a daily basis or real time basis. Two such update methods are known as "daily windows analysis" and "GPM", also reference is made to "graphical forensic scheduling system" U.S. Pat. No. 8,531,459, Sep. 10, 2013.

The problem with current methods are that they are good at evaluating where your critical path, activities and float are at a given time, but they are snapshots and lack continuity. Graphic display is usually in the form of a Gantt Chart or a time-logic diagram, which shows the starts and finishes of an activity which are listed out on a time-line (reference is made to aforementioned U.S. Pat. No. 8,531,459 Ponce Deleon FIGS. 2,3,4,5,6,7,9,11,12,13,14). Even when this data is updated rapidly or in real time, the display of this data lacks convergence continuity, which makes it difficult to observe trends that are occurring that could be useful in predicting delays so that they can be preemptively interdicted before or as they occur.

SUMMARY OF INVENTION

A graphical computer display system and method, which radially plots activities or tasks, as color coded two-dimensional geometric shapes or "blips" from an inner most circle which represents the date being observed. The colored blips represent activities in a CPM schedule. The color represents the urgency of performing the work of the activity, which corresponds to its total float. Total Float in scheduling terms is the amount of time an activity can be delayed before it delays the project. The radial distance from the inner most circle, represents how many days until the activity can start, which corresponds to its early start date. Early Start in CPM scheduling terms is the earliest an activity can begin, according to the logic of the CPM schedule.

The display is then animated by looping through start and finish dates designated by the user and plotting the abovementioned blips sequentially.

The visualization of impending delay could occur by the progress of urgent colored blips through time toward the inner most circle of the graph, or by seeing a blip near the inner circle start to change color from a non-urgent color to a more urgent color or any combination of the two. This visualization could thus provide an advanced alert before an activity begins actually delaying a project.

BRIEF DESCRIPTION OF DRAWINGS

The above and other aspects, features, and advantages of the invention will be better understood by referring to the following detailed description, which should be read in conjunction with the accompanying drawings, in which.

DETAILED DESCRIPTION OF THE PREFERRED EMBODIMENT

As mentioned above, prior work using CPM and computer modeling focus on determining critical paths and documenting delays at the time of an update. This invention is unique in that it places the progress data in an animated radial, radar view type display; so that the recent trends of the schedule can be visualized in a familiar way. It is like a combination of a radar screen and a weather map animation. By combining a visual display of changing color and location of activities the various ways of an activity or task becoming critical can be visualized in a variety of ways.

Figure 1:
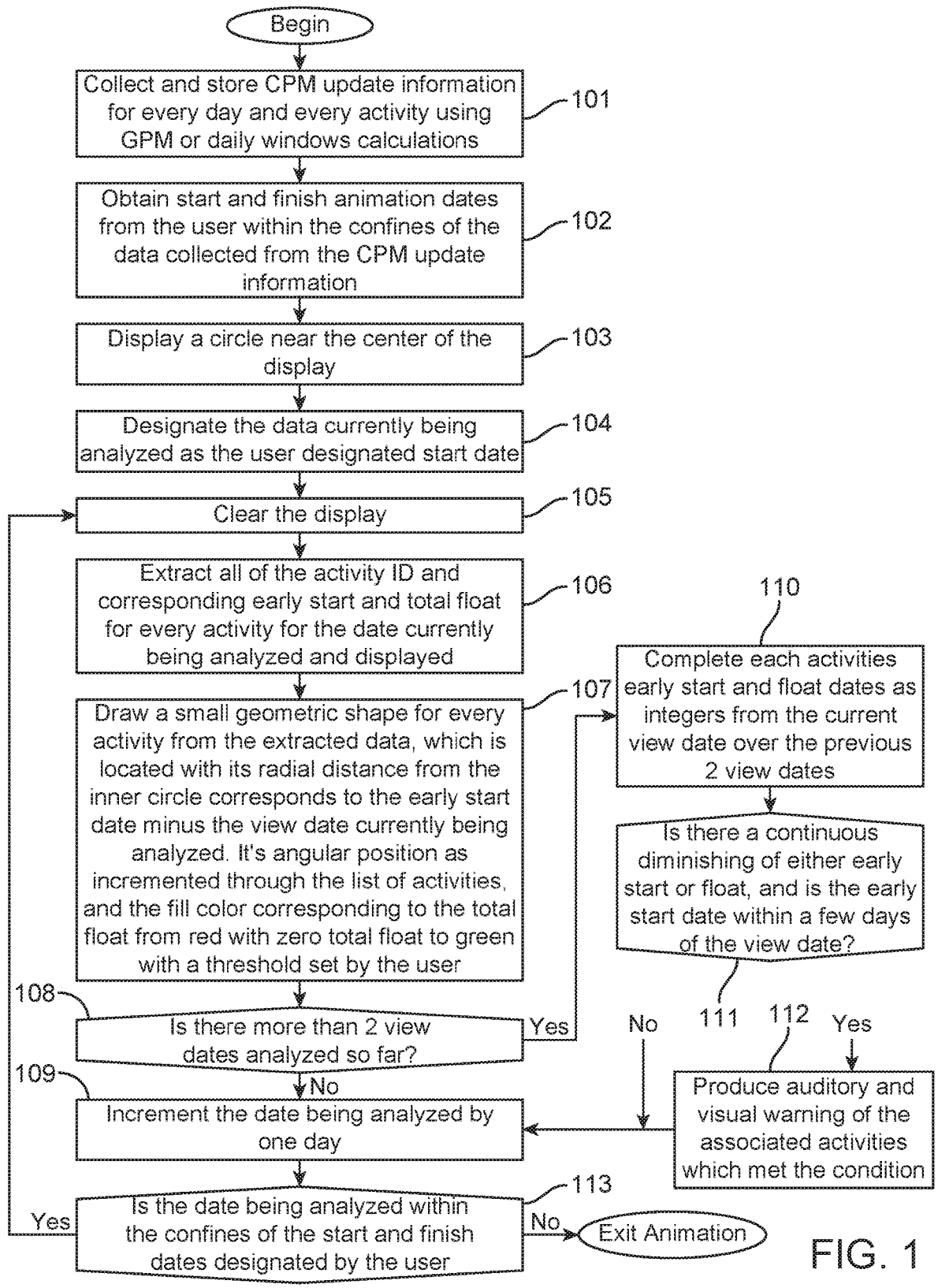
FIG. 1. is a flowchart describing one embodiment of the method of displaying the animated radial diagram on a computer monitor.

FIG. 1. is a flowchart describing an embodiment of the method of displaying the radial graphic to a user in accordance with the invention. The initial task at block 101, is to use a CPM method of calculation to compile the following data for every day which you have update information: unique activity identifier, total float of the activity as of the calculation date as an integer, early start date as of the calculation date as an integer, the date of calculation as an integer. This is then stored in the computer's memory.

In block 102 the start and finish dates of the animated loop must be designated and entered by the user, as well as, the float threshold as an integer, where the user designates the activities as non-critical. All of these are stored as an integer value.

In block 103, a circle 201 near the center of the radial graph is drawn to represent the radial position of zero days of float as of the date being animated. The radial position of the tasks will be calculated from this innermost circle.

Figure 2:
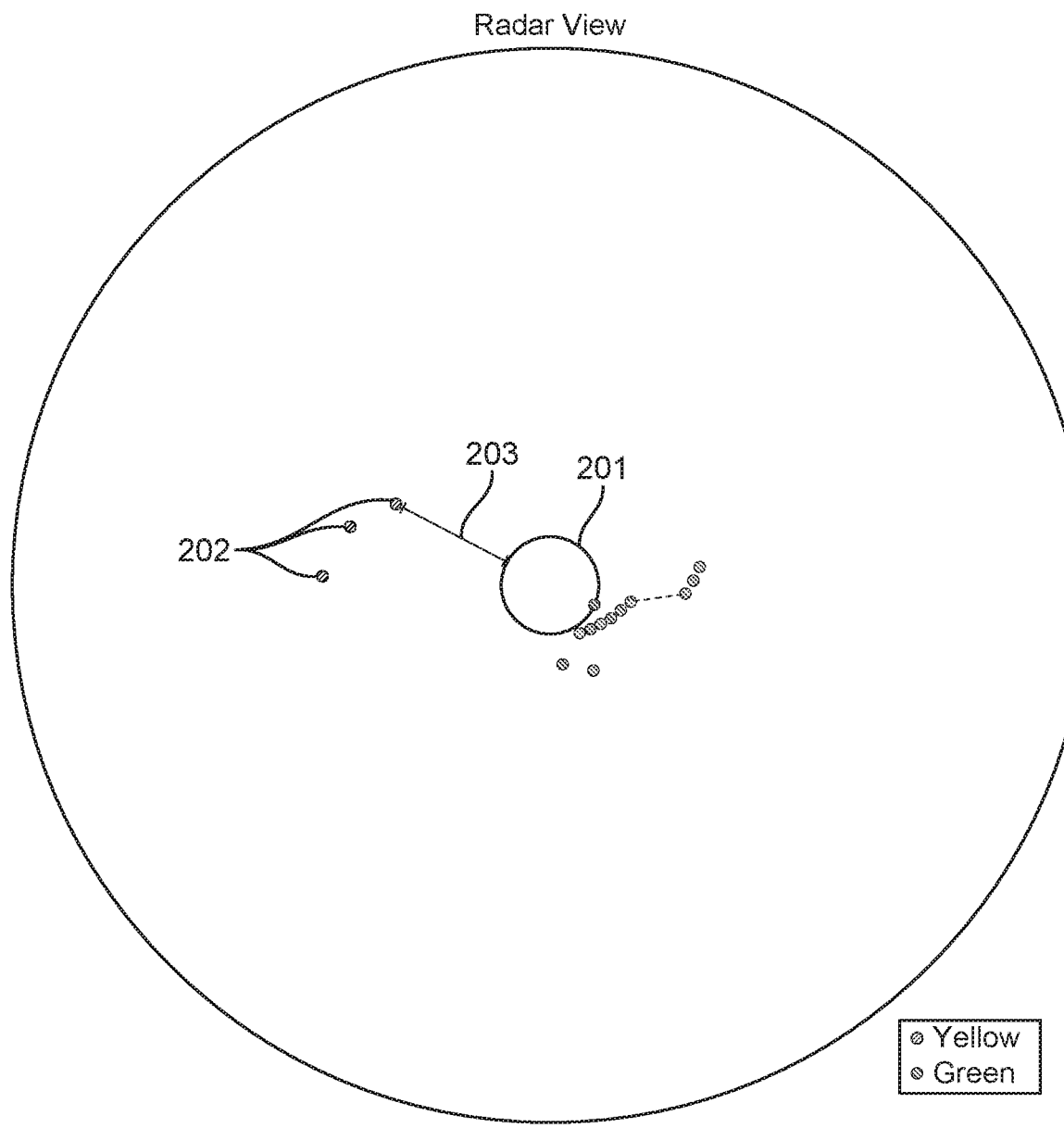
FIG. 2. is a more detailed view of how the display appears to the viewer on a single view date.
Figure 3:
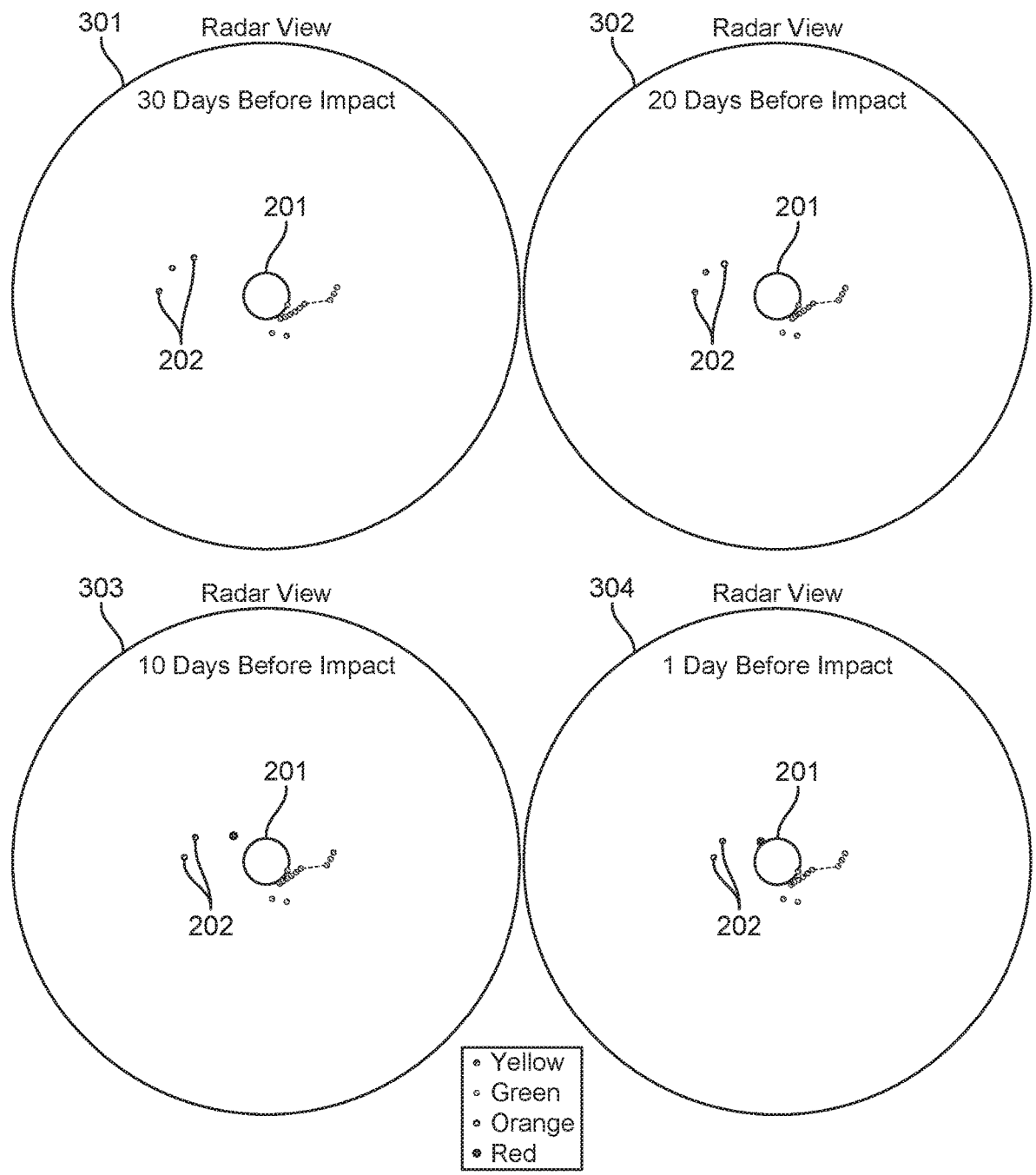
FIG. 3. is a sequential view to show how the change in location and color on the animated display can reveal impending impacts to the project.

In blocks 105 to 109 the invention begins to cycle through the dates in a loop from the designated start date to the finish date entered by the user. The graphic is first cleared from any previous plots, in block 105. In Block 106, from the previously compiled data, the activity identifier and the corresponding early start and float integers are extracted for every activity on the date currently being displayed on the cycled dates. Block 107, for every activity a small geometric shape such as a circle is plotted on the radial graphic. FIG. 2. is a more detailed view of how the display appears to the viewer on a single view date. For example, a sequential view in FIG. 3., shows how the change in location and color on the animated display can reveal impending impacts to the project, activities which are urgent and coming up soon represented in a small geometric shape such as a small circle or blips 202 is plotted on the sequential radial graphics 301, 302,303,304, could appear as blips changing to a red color and closing in on the inner most circle 201. Activities which can be done in the near future and which are becoming more and more urgent, will be near the inner most circle 201 and the color of the small geometric shape such as a small circle or blips 202 will be changing from green through yellow orange and red spectrum based on the criticality of the activity. Conversely, if an activity or group of activities become less critical the color of the small geometric shape such as a small circle or blips 202 will move from red toward green, giving you advance notice that it is safe to delay prosecuting this work and use your resources on other more critical tasks. In this way the display will provide a unique visualization of potential impacts before they actually delay a project. Additionally, sudden loss of float or retraction of early date can be accompanied by an auditory or blinking visual of the incoming activities to draw attention to their imminent impact on project time. The location of the geometric shapes such as a small circle or blips 202 is plotted for every activity with its radial degrees advanced by each subsequent plotted shape, and its radial distance 203 from the inner most circle 201, quantified by the difference between the early start of the activity as an integer, from the date being observed as an integer. Qualitatively, this means that the earlier an activity can start on the CPM network; the closer to the innermost circle 201 the geometric object is. The fill color of the designated geometric shape such as a small circle or blips 202 is set to a color representing the criticality of the activity, which corresponds to its integer float value. Activities with zero float (critical activities) would be colored red. Activities past a threshold of days (previously set by the user), would be designated green. Activities between 0 and the user threshold would be designated proportionately with the color on the HSV (hue saturation value) color wheel between green and red (i.e. from green to yellow to orange to red). Likewise, the transparency of the fill color is set incrementally from 90% for the green activities to 0% for the red activities so that the most critical ones are the most visible.

Blocks 110 to 112 refers to a sub-loop in the flow chart which detects sudden changes toward criticality, so that an audible and visible warning can be produced to the user of imminent delays. Block 110 and 111, compiles then compares the previous few days entries of float and early start dates of the activities as integers. Block 111 determines if there is a sudden retraction of value of either parameter. Block 112, then assesses if the latest early start value is close to the view date. If it is, then an audible and or visible warning such as a blinking of the geometric shapes of the involved activities is executed.

Block 109, the next date is then advanced in the loop

Conditional block 113 checks if the new date is within the start and finish dates designated by the user. If yes, the geometric shapes run through blocks 105 to 109 and redisplayed with color and location the geometric shapes for the next date in the loop as designated above.

The invention claimed is:

1. A method of generating an animated graphics display, wherein the animated graphics display is presented as a circular graphic similar to a radar screen for project planning, comprising an inner most circle and a plot moving and simultaneous color changing geometric shapes or blips representing tasks or activities in a CPM network, wherein the location, color and movement of said geometric shapes is determined by the method including the following steps:
   a. plotting a location of geometric shapes or blips on the circular graphic with their radial distance from the inner most circle corresponding to a difference from a date being observed to an earliest date an activity can start on the CPM network as of a day being observed, and
   b. denoting a float, which is an integer value of the days wherein an activity can be delayed before it delays a project, by the plot moving and simultaneous color changing geometric shapes or blips, wherein the blips are animated by cycling through user designated start and finish dates to replot the location and color of the blips as determined by steps (a) and (b).

2. The method of claim 1, wherein said blips in step (b) change color incrementally on the color HSV color spectrum from green which is set at a threshold integer of float by the user, to red which is set to zero days float.

3. The method of claim 1, wherein the transparency of the color of the geometric shape is set on a scale from a higher transparency for the least critical color to no transparency for the most critical color so as to display more critical activities prominently over lesser ones.

4. The method of claim 1, generating a list which accompanies the circular graphic, in order of urgency as a combination of the amount of time until a work can begin and the urgency of starting that work on time so that the project is not delayed.

5. The method of claim 1, generating auditory warning and or visual warning of the associated geometric shapes, when there is a sudden diminishing of float or retraction of early start or both, where it is close enough to the date being viewed as to pose an imminent impact to project completion.

\* \* \* \* \*